(12) United States Patent
Ghodake et al.

(10) Patent No.: US 12,326,855 B1
(45) Date of Patent: Jun. 10, 2025

(54) ENSURING DATA CONSISTENCY ACROSS MULTIPLE MONITORING SERVICES

(71) Applicant: Dell Products L.P., Round Rock,, TX (US)

(72) Inventors: Ganesh Ghodake, Pune (IN); Ofir Ezrielev, Beer Sheva (IL)

(73) Assignee: Dell Products L.P., Rock Rock, TX (US)

( * ) Notice: Subject to any disclaimer, the term of this patent is extended or adjusted under 35 U.S.C. 154(b) by 0 days.

(21) Appl. No.: 18/748,693

(22) Filed: Jun. 20, 2024

(51) Int. Cl.
   *G06F 16/20* (2019.01)
   *G06F 16/23* (2019.01)
   *G06F 16/27* (2019.01)

(52) U.S. Cl.
   CPC .......... *G06F 16/2365* (2019.01); *G06F 16/27* (2019.01)

(58) Field of Classification Search
   None
   See application file for complete search history.

(56) References Cited

U.S. PATENT DOCUMENTS

| | | | |
|---|---|---|---|
| 12,074,953 B2 * | 8/2024 | Patro | G06F 9/5072 |
| 2010/0100590 A1 * | 4/2010 | Palay | G06Q 10/107 |
| | | | 709/203 |
| 2014/0136638 A1 * | 5/2014 | Zhang | H04L 51/04 |
| | | | 709/206 |
| 2014/0201144 A1 * | 7/2014 | Vibhor | G06F 16/178 |
| | | | 707/634 |
| 2021/0243713 A1 * | 8/2021 | Ellenbeck | H04W 56/002 |

* cited by examiner

*Primary Examiner* — Jau Shya Meng
(74) *Attorney, Agent, or Firm* — Dergosits & Noah LLP; Todd A. Noah

(57) ABSTRACT

Ensuring data consistency across multiple monitoring services is described. If a synchronization criterion is satisfied, a data originator service, which monitors at least one component of a data protection platform, sends a synchronization indicator to monitoring services that monitor the components of the data protection platform. If at least one of the monitoring services responds to receiving the synchronization indicator by initiating synchronization of updated data, the data originator service sends the updated data to the at least one of the monitoring services, which stores the updated data received from the data originator service. If each of the monitoring services that received the synchronization indicator either stored the updated data or is yet to initiate synchronization of the updated data, the data originator service enables simultaneous update of a display of the updated data for a user of any of the monitoring services.

20 Claims, 6 Drawing Sheets

FIG. 2A

| Time | Events |
|---|---|
| 3:57 A.M. | The system creates the backup job J1 and the job service marks it in progress |
| 4:00 A.M. | The extract, transform, and load service extracts the job J1 data and transforms and loads the job J1 data to the report service, which stores the job J1 data for any report generation. The job service continues marking the job J1 as in progress. |
| 4:01 A.M. | The job service marks the job J1 as failed |
| 4:03 A.M. | The user requests a report from 3:00 AM to the current time, which is 4:03 A.M. |
| 4:05 A.M. | The report service generates the requested report, which shows the job J1 as being in progress, even though the job service marked the job J1 as failed 4 minutes ago. |

FIG. 2B

| Times | Events |
|---|---|
| 3:30 A.M. | The alert service generates an alert A1 for a network interface card failure. |
| 3:32 A.M. | The extract, transform, and load service extracts the alert A1 data and then transforms and loads the alert A1 data to the health service, which stores the alert A1 data for any health grading, and grades a degraded health based on the failed network interface card. |
| 9:21 A.M. | A technician replaces the failed network interface card, and the alert service changes the status of the alert A1 to fixed. |
| 9:22 A.M. | The health service still shows an alert for the failed network interface card and a degraded health |
| 9:22 A.M. | The extract, transform, and load service extracts the updated alert A1 data and then transforms and loads the updated alert A1 data to the health service, which stores the alert A1 data for any health grading.. |
| 9:23 A.M. | The health service grades the system health again and shows the result as good because the alert for the failed network interface card is removed. |

ENSURING DATA CONSISTENCY ACROSS MULTIPLE MONITORING SERVICES

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

A data user may copy a data object in a data center to one or more remote sites, which may be in one or more cloud locations, to have copies of the data object in case of a data center disaster, and/or the data user may copy data objects from remote sites to a centralized data center. Data storage systems include recording media that retain digital information such as data objects, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system may store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

A data protection platform may be composed of many components which enable a data user to create backup copies of data objects, deduplicate the copies of data objects, and store the deduplicated copies of data objects efficiently in high availability clusters of data storage systems. For such a data protection platform, the monitoring ecosystem is very important and can include different services or micro-services with their own specifications, such as monitoring services for alerts, jobs, audits, reports, health, failure prediction, anomaly detection, different dashboards, etc. These monitoring services provide a product runtime status, enable a data user to manage their system, and inform the data user whether or not their system is producing the desired results.

Each monitoring service provides its own unique insights via its own specification and its various requirements for managing data, such as database type, I/O rate, and data expiration. Some of the monitoring services may be dependent upon data that was previously copied and received from other monitoring services. When data transfer services copy data to a dependent monitoring service, the time when some of the data that was copied eventually becomes final is not clear, thereby potentially creating data consistency issues. Some of the copied data may become stale data in the dependent monitoring services after the same copied data was subsequently updated in the originating monitoring services, but has yet to be updated in the dependent monitoring service.

Therefore, when a data user requests monitoring data from these different monitoring services, the data user may experience inconsistencies between the requested data provided by different monitoring services. Solving this inconsistency problem by storing a single master set of data for all the monitoring services is not optimal because of the different requirements of the monitoring services.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIGS. 2A and 2B are block diagrams illustrating example events timelines for monitoring services for components of a data protection platform.

DETAILED DESCRIPTION

Figure 1:
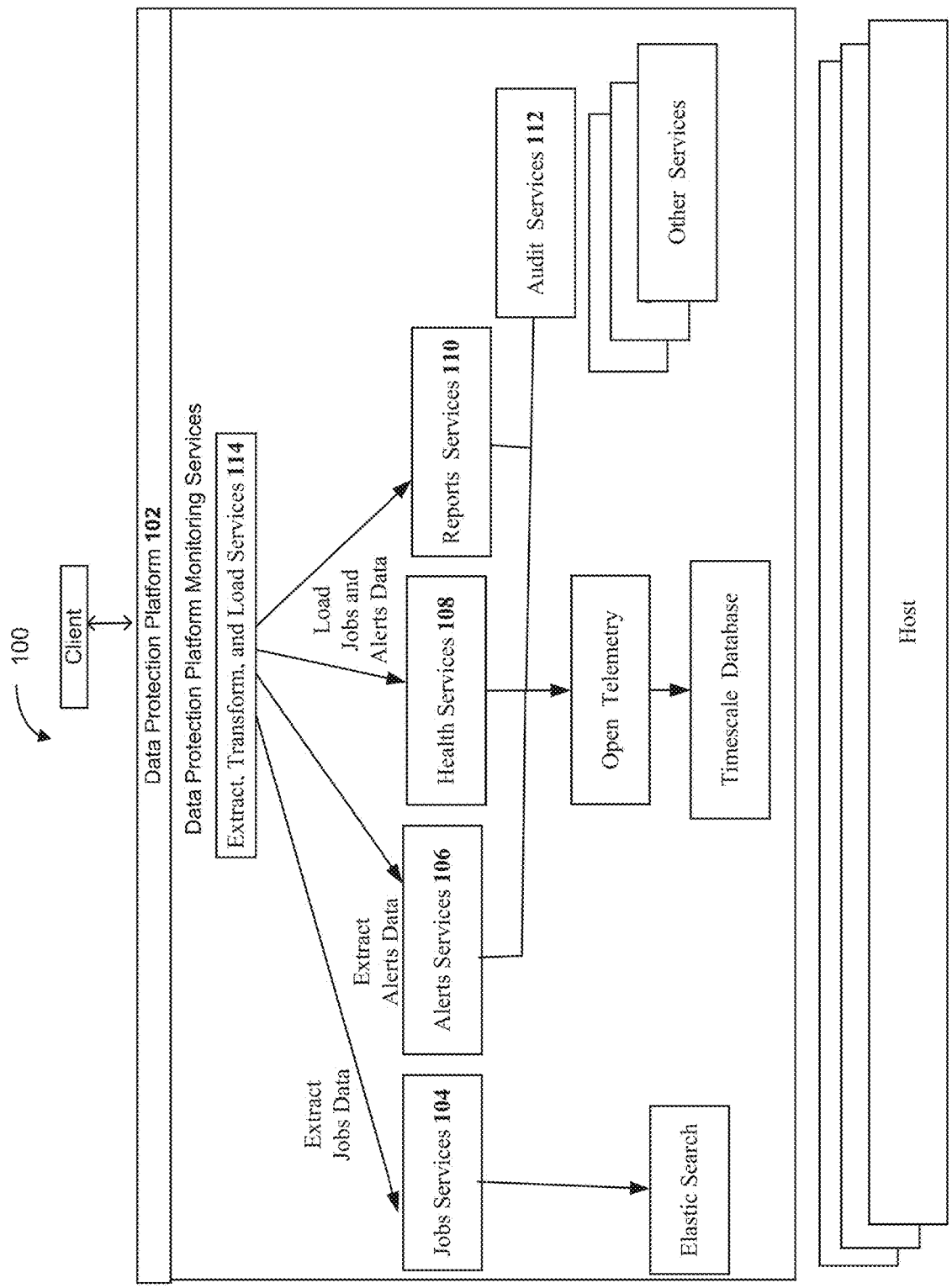
FIG. 1 is a block diagram illustrating parts of an example operating environment for components of a data protection platform.

FIG. 1 is a block diagram illustrating parts of an example operating environment 100 for a data protection platform 102. In a cluster of data protection platforms, a data protection platform 102 executes monitoring services, such as a jobs service 104, an alerts service 106, a health service 108, a reports service 110, an audits service 112, and an extract, transform, and load service 114. The jobs service 104 updates jobs data until jobs are complete, within no fixed time limit. Similarly, the alerts service 106 updates alerts data due to aggregation, acknowledgement, note addition, and due to some other feature support, within no fixed time limit. As depicted in FIG. 1, the extract, transform, and load service 114 extracts data from the jobs service 104 and the alerts service 106, transforms copies of the jobs data and the alert data into formats used by the other monitoring services, and then loads the transformed copies of the jobs data and the alert data into the other monitoring services, such as the health service 108 and the reports service 110.

However, maintaining data consistency between monitoring services in these circumstances may be challenging. As some monitoring services such as the jobs service 104 and the alerts service 106 update their own data but do not update the data in the dependent monitoring services, such as the health service 108 and the reports service 110, the data protection platform 102 cannot maintain data consistency across multiple monitoring service's data as viewed by a data user. For example, the extract, transform, and load service 114 extracts jobs data from the jobs service 104 every 5 minutes, transforms the extracted jobs data to the various formats required by the dependent monitoring systems, and loads the transformed jobs data to the dependent reports service 110, which requires long term data and customer visible fields. However, since each job can run for weeks with no hard deadline, multiple opportunities can arise when inconsistencies can occur between the live job data maintained in the jobs service 104 and the previously copied job data that was previously stored by the reports service 110.

FIGS. 2A and 2B are block diagrams illustrating example events timelines for monitoring services for components of a data protection platform 102. FIG. 2A depicts an example events timeline 200 which indicates that after a backup job J1 is created, the jobs service 104 marks the job J1 as in progress. Subsequently, the extract, transform, and load service 114 extracts the jobs data from the jobs service 104, transforms the extracted jobs data, and loads the transformed jobs data to the report service 110, which stores the jobs data, including the in-progress status of the job J1, for any report generation.

Shortly thereafter, the job service 104 determines that the job J1 failed and marks the job J1 as failed. A few minutes later, a user requests a report from the report service 110, which generates a report based on the jobs data that it currently stores, which includes the outdated jobs data that indicated that the job J1 was in progress, even though the jobs service 104 has the updated job data which marks the job J1 as failed. Even if the extract, transform, and load service 114 is modified to execute more frequently, a time lag for the dependent services would only be reduced, but would still remain.

In another example, the extract, transform, and load service 114 extracts alert data from the alerts service 106 every 2 minutes, transforms the extracted alert data, and then loads the transformed alert data to the health service 108. Since the alerts service 106 can update the alerts data to indicate either fixed or acknowledged at any time, there is no hard deadline for the updating or the finality of the alerts data. The health service 108 also requires some time to grade the various aspects of the data protection platform's health. FIG. 2B depicts an example of an events timeline 202 which indicates that after the alerts service 106 identified an alert A1 in response to a network interface card failure, the extract, transform, and load service 114 extracted the alert A1 data, transformed the extracted alert A1 data, and loaded the transformed alert A1 data to the health service 108, which stored the alert A1 data for any subsequent health grading. Hours later, when a technician replaces the failed network interface card, the alerts service 106 changes the alert status for the alert A1 to fixed, but the health service 108 still shows a network interface card failure alert with a degraded health grade.

The current common solution could be maintaining a single copy of the data set, with all monitoring services referring to the data from the same database. However, since each monitoring service has different fields, different data expirations, and different formats, maintaining a single source of truth for all use cases or services is not optimal, and therefore undesirable, due to these different data requirements. Also, the data protection platform 102 needs to maintain data consistency not only internally, but also for external use cases, such as CloudIQ and Telemetry data where the data protection platform 102 cannot share such a single source of truth database.

In some embodiments, a system (and a computer program product and a method) ensures data consistency across multiple monitoring services. If a synchronization criterion is satisfied, a data originator service, which monitors at least one component of a data protection platform, sends a synchronization indicator to monitoring services that monitor the at least one component of the data protection platform. If at least one of the monitoring services responds to receiving the synchronization indicator by initiating synchronization of updated data, the data originator service sends the updated data to the at least one of the monitoring services. The at least one of the monitoring services stores the updated data received from the data originator service. If each of the monitoring services that received the synchronization indicator either stored the updated data or is yet to initiate synchronization of the updated data, the data originator service enables simultaneous update of a display of the updated data for a user of any of the monitoring services.

For example, a synchronization criterion is satisfied because the alerts service 106 determined that a technician replaced a faulty flash drive, the alerts service 106 sent a synchronization token to the monitoring services that monitor the data protection platform 102. Since the health service 108 responds to receiving the synchronization token by initiating synchronization of updated alert data, the alert service 106 sends the updated data about clearing the alert A2 for the faulty flash drive to the health service 108. The health service 108 replaces the outdated data for the alert A2 with the updated data for alert A2 received from the alert service 106. Since each of the monitoring services that received the synchronization token, which includes the health service 108 and the reports service 110, either stored the updated data for the alert A2 or did not yet initiate synchronization of the updated data, the alerts service 106 sets a visibility flag for the updated alert data for the alert A2. When the health service 108 and the reports service 110 identify the visibility flag set for the updated alert data for the alert A2, the alert service 106, the health service 108, and the reports service 110 simultaneously update the visible display of the updated alert data for the alert A2, which is viewed as correct and consistent data by a user of the monitoring services 106-110.

Various embodiments and aspects of the disclosures are described with reference to details discussed below, and the accompanying drawings illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Any of the client devices can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 3:
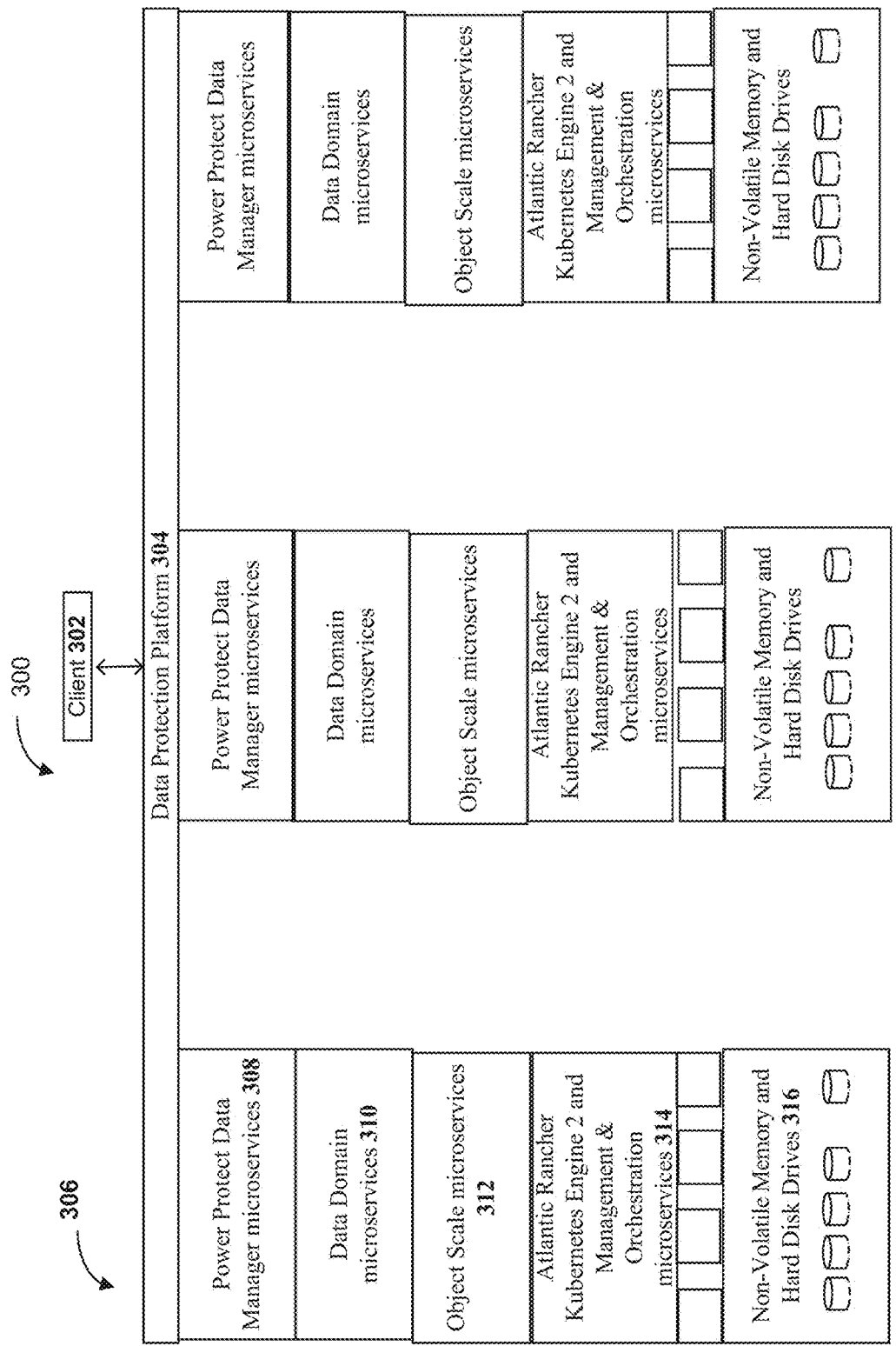
FIG. 3 is a block diagram illustrating an example operating environment for ensuring data consistency across multiple monitoring services for components of a data protection platform according to one or more embodiments of the disclosure.

FIG. 3 is a block diagram illustrating an example operating environment 300 for ensuring data consistency across multiple monitoring services according to one or more embodiments of the disclosure. A client, such as the client device 302, may execute, or otherwise be associated with, one or more instances of each of one or more applications, and may be associated with a customer of a data backup and protection service. For example, a client may provide computing resources (such as databases) for users (such as website visitors) of a data protection service provider, and data which may be protected by and restored by executing the data protection service provider's backup application, and may include a primary storage system to store client data, as well as an interface for communicating with other systems and devices. While example applications may include database applications such as a SQL Server, data file systems, as well as other types of data stores, the applications executed by any client are not limited to any particular functionality or type of functionality. As further described herein, elements of a client (such as client applications and data storage) may be a data source, or be associated with one or more data sources such as a database, a virtual machine, and a storage device.

At least some functionality may be provided by, or implemented in connection with, various data protection service provider's platform components provided by Dell Technologies, and associated systems, methods, and elements, although the use of these particular platform components is provided only by way of illustration and is not required. FIG. 3 depicts a high-level overview of an example three-node cluster architecture for a data protection platform 304. For example, node 306 consists of components such as Power Protect Data Manager microservices 308, Power Protect Data Domain microservices 310, Object Scale microservices 312, Atlantic Rancher Kubernetes Engine 2, Management & Orchestration microservices 314, and Non-Volatile Memory and Hard Disk Drives 316. As more nodes are added, the data protection platform 304 scales components such as Central Processing Units (CPU), Random Access Memory (RAM), storage, and networking accordingly. Although examples describe ensuring data consistency across multiple monitoring services which monitor the components of a data protection platform, ensuring data consistency across multiple monitoring services is equally applicable to monitoring services which monitor less than all of the components of the data protection platform, and may apply to monitoring services which monitor as few as only one of the components of the data protection platform.

Figure 4:
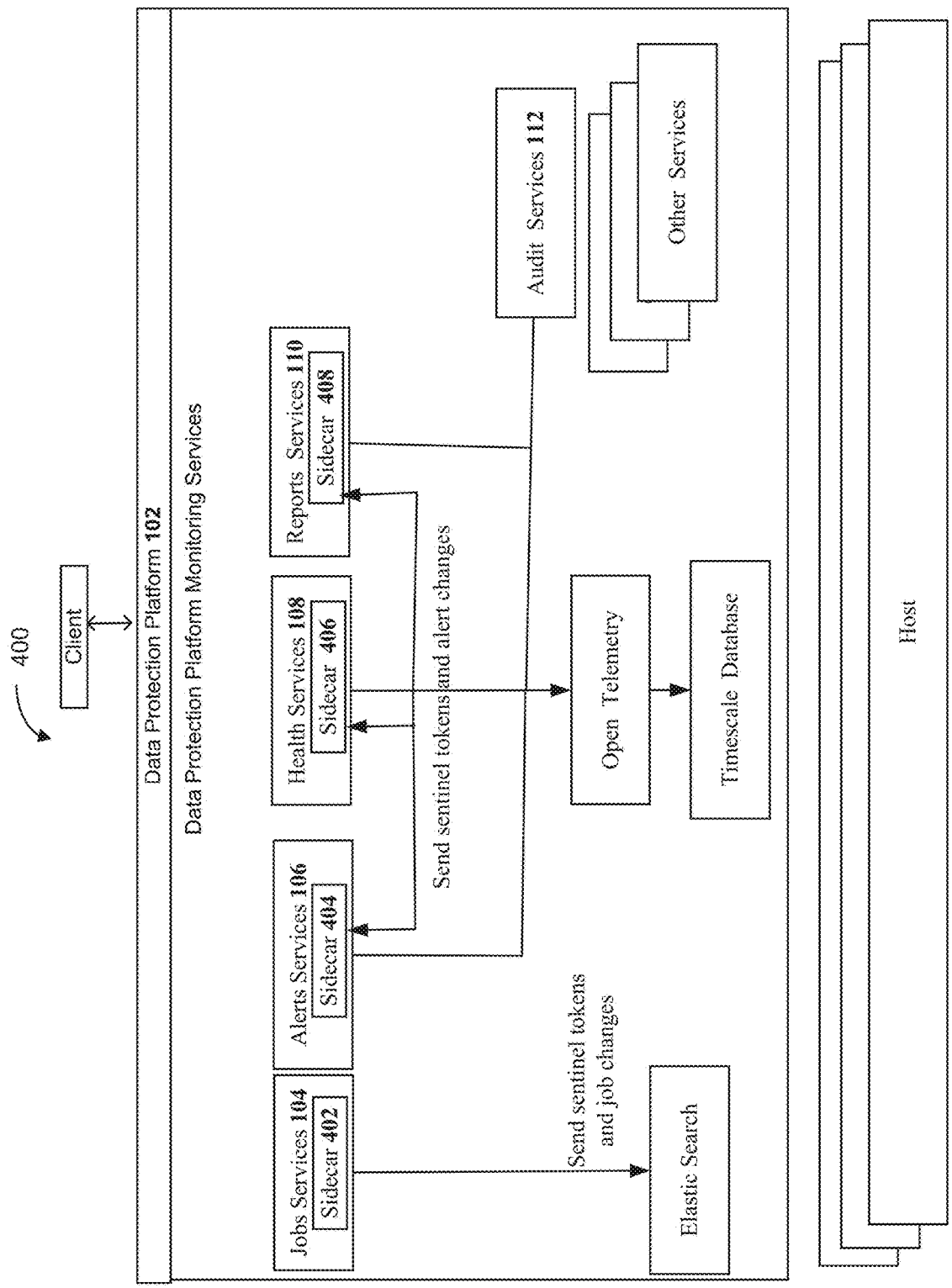
FIG. 4 is a block diagram illustrating another example operating environment for ensuring data consistency across multiple monitoring services for components of a data protection platform according to one or more embodiments of the disclosure

FIG. 4 is a block diagram illustrating another example operating environment 400 for ensuring data consistency across multiple monitoring services according to one or more embodiments of the disclosure. With the exception of the additional elements 402-408 which are described below, the operating environment 400 is substantially similar to the operating environment 100 depicted in FIG. 1 and described above. A data originator service, such as the jobs service 104 and/or the alerts service 106, initiates the data synchronization process with the other monitoring services, such as the health service 108 and/or the reports service 110, in the data protection platform 102. The synchronization of new changes in data from a data originator service with the other monitoring services may be handled using workflow and initiated based on data critically or importance, thereby avoiding unnecessary synchronization for trivial changes in monitoring service data and reducing the processing load on the monitoring services. Once all of the required monitoring services complete the synchronization workflow, the data originator service can make the changed monitoring service data simultaneously visible to the data user or the customer via multiple monitoring services, and maintain the visibility status of the changed monitoring service data which it originates. After being generated and then copied at multiple places, the data originator service makes the changed monitoring services data available and visible at the same time via all of the monitoring services that store that data.

As some of the monitoring service data is trivial for a customer, a data originator service may delay synchronization of such trivial changes in monitoring service data. Hence, rather than synchronize each change to any monitoring service data, the data originator service synchronizes only critical and/or important changes in the monitoring service data. Examples of such critical changes include job state change, alert severity, and major changes in the job workflow (steps), etc. A data originator service provides subscription support to define the critical data fields and sends monitoring service data change notifications only when any of the subscribed synchronization criteria is satisfied. If synchronization criteria are not defined, the data originator service ensures that data synchronization occurs within a default time interval.

The data originator service can use a sidecar service to synchronize the new changes in monitoring service data with the other monitoring services. A sidecar or a sidecar service is an application that is connected to and provides services and/or supporting processes for a primary or parent application, similar to a physical sidecar that is connected to and provides a service for physical motorbike. The sidecar application is deployed with and goes wherever the parent application goes. For example, FIG. 4 depicts that the jobs service 104 is deployed with a sidecar 402, the alerts service 106 is deployed with a sidecar 404, the health service 108 is deployed with a sidecar 406, and the reports service 110 is deployed with a sidecar 408.

A sidecar monitors the new changes in the monitoring service data for a data originator service and generates a special indicator, which may be referred to as a "synchronization token" or a "sentinel token," which is generated when specific data fields values which are defined in the subscriptions of the monitoring service data are satisfied. The sentinel token is a special token which defines when the other monitoring services should synchronize the data which they received from a sidecar for a data originator service, which generates the sentinel token when the subscription criteria is satisfied. To accommodate retention and subscription edge cases, a sidecar for a data originator service sends a sentinel token before retention of the original data.

One example of sentinel token generation criteria is based on a specific [1-N] number of data fields which have a value that changed, such as the job data fields for state or step. Another example of sentinel token generation criteria is a specific data field value in a certain range or category, such as a critical alert value for an alerts data severity field. A sentinel token can contain additional details such as impacted area, and value addition in terms of weight, priority, category, etc. These details can assist sidecars for the other monitoring services to decide whether or not to synchronize with the monitoring service data described by such details.

When a sidecar for a data originator service sends a sentinel token to the sidecars for the other monitoring services, this communicates information about new changes to the monitoring service data for the data originator service so the sidecars for the other monitoring services can initiate the synchronization process if required. A sidecar for a data originator service can wait for a maximum duration, such as MaxSyncTime, for a data synchronization response to the sentinel token from each of the sidecars for the other monitoring services.

A sidecar initially sends only a sentinel token for a data originator service to the sidecars for the other monitoring services, and not the actual changes in the monitoring services data for the data originator service. Then the sidecars for the other monitoring services initiate the synchronization process as per their own requirements. For example, the sidecar 404 for the alerts service 106 sends a sentinel token to the sidecar 406 for the reports service 108, which initiates data synchronization, and to the sidecar 408 for the reporting service 110, which also initiates data synchronization.

A sidecar for a data originator service caches only the most recent and the most important changes in the monitoring service data for the data originator service. A sidecar for a data originator service caches only the changes to the monitoring service data which changed since the previous sentinel token was distributed to the other monitoring services. A sidecar for a data originator service caches only the new changes to the monitoring service data that satisfy any of the synchronization criteria. Consequently, the data synchronization may process only the most recent and the most important data changes for a data originator service, thereby resulting in a minimal processing load on the component(s) of the data protection platform 102 and the other monitoring services' hardware resources, such as network, CPU, and memory.

After a sidecar for a data originator service sends a sentinel token to the other monitoring services, the data synchronization workflow starts for each of the other monitoring services. The workflow can include the following states: no data synchronization process is required, or the data synchronization process is skipped this time, the data synchronization process is initiated, the data synchronization process is in progress, and/or the data synchronization process is completed.

A sidecar for a monitoring service executes a data synchronization workflow. Examples of the workflow steps include a sidecar S1 for a data originator service sending a sentinel token to the sidecars S2 for the other monitoring service sidecars and waiting for responses. A response from any of the sidecars S2 could be that a data synchronization is not required for the sidecar's monitoring service, such that the workflow is complete for that sidecar and that monitoring service. If any of the sidecars S2 for the other monitoring services determines that data synchronization is required for any of the monitoring services, the sidecar S2 for such a monitoring service initiates the data synchronization process by requesting the changes in the monitoring service data from the sidecar S1 for the data originator service.

Next, the sidecar S1 for the data originator service sends the new changes in the monitoring service data, which were recorded since the previous sentinel token was sent to the sidecars S2 for the other monitoring services, to a sidecar S2 for a requesting monitoring service. For example, FIG. 4 depicts the alerts service sidecar 406 first sending the sentinel token and then sending the alert changes to the health service sidecar 408 and/or the reports service sidecar 410 for synchronization. After requesting the changes in the monitoring service data, the sidecar S2 for the requesting monitoring service maintains the status of the workflow as an in-progress state. After receiving the new changes in the monitoring service data from the sidecar S1 for the data originator service, the sidecar S2 for the requesting monitoring service stores the data in its own local cache until the visibility flag is set for the changes in the monitoring service data.

Each sidecar S2 for the other monitoring services which requested the changes in the monitoring service data from a sidecar S1 for a data originator service, notifies the sidecar S1 for the data originator service when its individual data synchronization process is complete. When a sidecar S1 for a data originator service receives synchronization complete notifications from all the sidecars S2 which requested the changes in the monitoring service data, then the sidecar S1 for the data originator service sends a data synchronization process completed status to all the sidecars S2 which requested the changes in the monitoring service data, and the workflow ends. Once the workflow for all of the required monitoring services are in the data synchronization process completed state and the remaining monitoring services remain in the data synchronization process not required state, then the sidecar S1 for the data originator service sets its visibility flag for the changes in the monitoring service data.

Then the sidecar S2 for the requesting monitoring service and the sidecar S1 for the data originator service simultaneously respond to the visibility flag being set by flushing the changes to the monitoring service data which is stored in its own local cache to the corresponding databases for each of these monitoring services, thereby making all the changes to the monitoring service data simultaneously visible to any users of any of these monitoring services. A sidecar for a data originator service uses a visibility flag to make the changes in the monitoring service data visible when the sidecars for all the required monitoring services synchronize the changes in the monitoring system data, even when the monitoring system data is not required for them, or when the timeout (MaxSyncTime) is reached. A sidecar for a data originator service can maintain the visibility flag for the changes to the monitoring service data to indicate whether or not this data is visible, which is useful when showing monitoring service data to the data user/customer and while sharing the monitoring service data with external solutions, such as CloudIQ through a Telemetry service. The Telemetry service is responsible for sending changes in monitoring service data to external solutions such as CloudIQ and shares only monitoring service data that has been determined to be visible with an external solution.

A sidecar for a data originator service removes the dependency on the extract, transform, and load service 114 depicted in FIG. 1. The data sharing between a data originator service and each of the other monitoring services is near real time and uses the same sidecar solution. A data originator service sends changes in the monitoring service data to only the other monitoring services which require the changed data, and hence the audit service is not involved in the data sharing. Defining the visibility of the changes to the monitoring service data to the customer is based on data sharing acknowledgements and/or receipt status of sidecars for the monitoring services. The component(s) of the data protection platform 102 enable the providing of correct, real-time, and consistent views of changes to monitoring service data to customers via both internal and external systems, which improves product experience and confidence.

Figure 5:
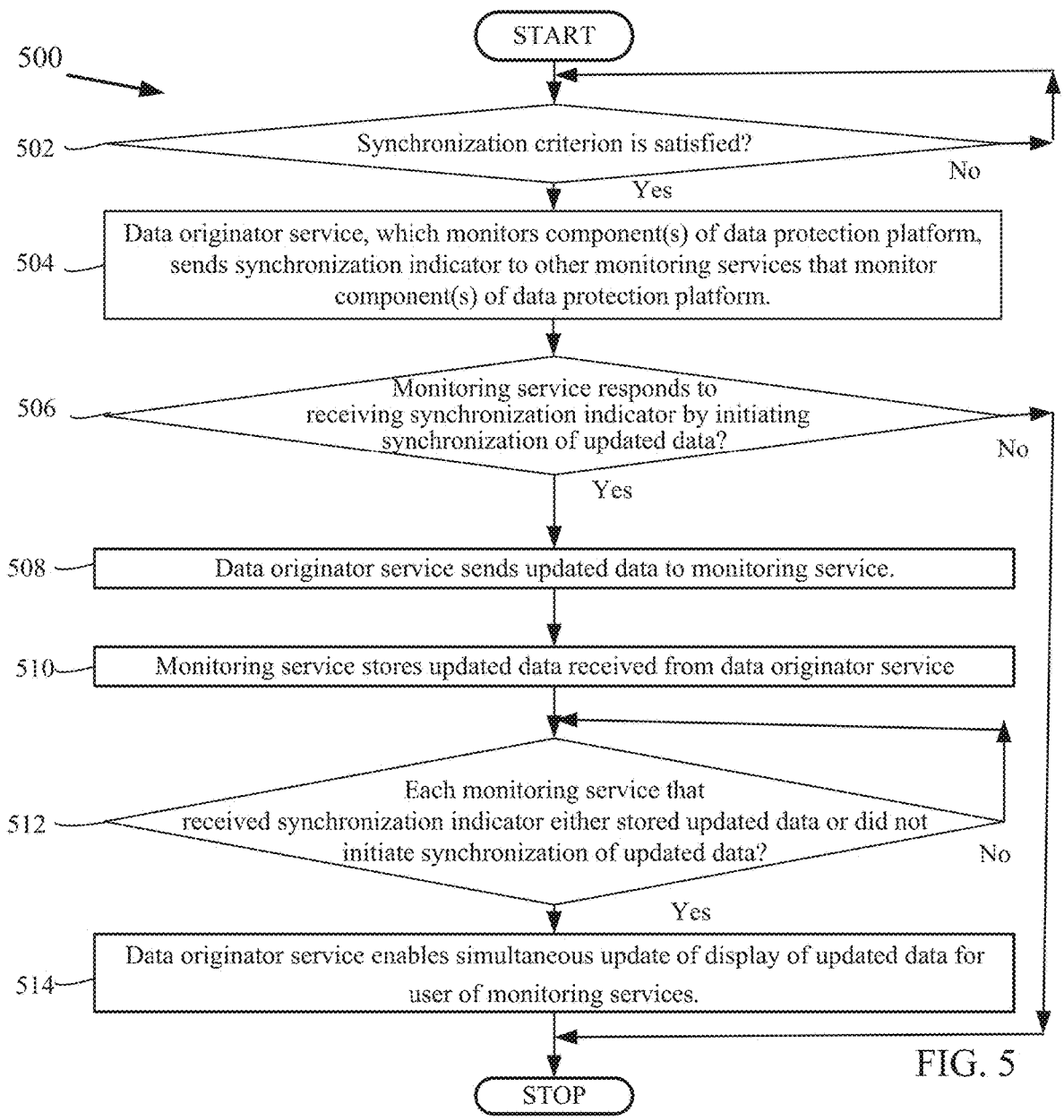
FIG. 5 is a block diagram illustrating an example method for ensuring data consistency across multiple monitoring services for components of a data protection platform according to one or more embodiments of the disclosure.

FIG. 5 is a flowchart that illustrates a method for ensuring data consistency across multiple monitoring services, under an embodiment. The flowchart 500 illustrates method acts illustrated as flowchart blocks for certain steps involving the client 302 and the component(s) of the data protection platform 304 of FIG. 3. FIG. 5 depicts the flowchart 500 as a method for ensuring data consistency across multiple monitoring services, with the method acts illustrated as flowchart blocks 502-514.

A determination is made whether a data synchronization criterion is satisfied, block 502. The system determines whether data changes indicate to begin the synchronization process. For example, and without limitation, this can include the synchronization criteria becoming satisfied because the alerts service 106 determined that a technician replaced a faulty flash drive, which enables the alerts service 106 to send a sentinel token to the monitoring services that monitor components of the data protection platform 102. Synchronization criteria can be standards to decide on an action for causing a set of data to be identical in more than one location.

The synchronization criteria may be satisfied by at least one of a specific number of data fields that changed, a specific value stored in a data field, or a maximum time that lapsed. For example, the status of the alert A2 changing from a critical status to a normal operating status is a sufficient change to satisfy the synchronization criteria, even without any other changes.

A specific number can be a particular arithmetical value. A data field can be a group of values within a table that stores information. A specific value can be the representation of a particular entity that may be manipulated by a program. A maximum time can be a greatest amount possible for a chronological measure.

The synchronization criteria may be created by at least one of the other monitoring services subscribing to at least one data field. For example, both the health service 108 and the reports service 110 subscribed to any critical change in an alert status as sufficient to satisfy the synchronization criteria.

If any of the synchronization criteria is satisfied, the flowchart 500 continues to block 504 to send a sentinel token. If none of the synchronization criteria is satisfied, the flowchart 500 remains at block 502 to wait until the circumstances require the sending of a sentinel token.

If any of the synchronization criteria is satisfied, a data originator service that monitors component(s) of a data protection platform sends a synchronization indicator to the other monitoring services that monitor the component(s) of the data protection platform, block 504. The system sends a token that can begin the data synchronization process. By way of example and without limitation, this can include the sidecar 404 for the alerts service 106 sending a sentinel token to the sidecars for the other monitoring services that monitor the component(s) of the data protection platform 102 because the synchronization criteria were satisfied when the alerts service 106 determined that a technician replaced a faulty flash drive that created the critical alert A2.

A data originator service can be the process of helping or doing work by being the source of information used by a computer. A component can be a part or element of a larger whole, especially a part of a machine. A data protection platform can be a combination of hardware and/or software that safeguards information from damage, corruption or loss and ensures that the information is readily available to users through backup and recovery. A synchronization indicator can be a digital representation of an action for causing a set of data to be identical in more than one location. A monitoring service can be the process of helping or doing work by observing and checking the progress or quality of something over a period of time, the keeping under systematic review.

The synchronization indicator or token can list details about the updated data, with the details including an impacted area, and/or a value addition associated with a weight, a priority, and/or a category, wherein the details assist the other monitoring services to determine whether to initiate synchronization of the updated data. For example, the sentinel token specifies that the change of the alert status from critical to resolved is the highest priority change possible for the alert service 106, so the health service 108 and the reports service 110 both subscribe to this change of a critical alert status, which makes this type of alert change sufficient to satisfy the synchronization criteria.

A detail can be an individual feature or fact. An impacted area can be a subject or range of activity or interest which has been or is to be effected. A value addition can be the representation of an additional entity that may be manipulated by a program. A weight can be a factor associated with one of a set of numerical quantities, used to represent its importance relative to the other members of the set. A priority can be the quality or state of coming before another in time or importance. A category can be a class or division of things regarded as having particular shared characteristics.

Following the sending of a synchronization indicator to the other monitoring services that monitor component(s) of a data protection platform, a determination is made whether at least one of the other monitoring services responds to receiving the synchronization indicator by initiating synchronization of updated data, block 506. The system determines if any monitoring service responded to the synchronization indicator by initiating the synchronization process. In embodiments, this can include the sidecar 404 for the alert service 106 determining that the sidecar 406 for the health service 108 responded to receiving the sentinel token by initiating synchronization of updated alert data. Updated data can be the latest information about facts used by a computer.

If at least one of the other monitoring services which received the synchronization indicator responds to receiving the synchronization indicator by initiating synchronization of updated data, then the flowchart 500 continues to block 508 to send the updated data to the required monitoring services. If none of the monitoring services which received the synchronization indicator responds to receiving the synchronization indicator by initiating synchronization of updated data, then the flowchart 500 terminates.

If at least one of the other monitoring services which received the synchronization indicator responds to receiving the synchronization indicator by initiating synchronization of updated data, then the data originator service sends the updated data to the at least one of the monitoring services, block 508. The system sends updated data to enable synchronization of data changes. For example, and without limitation, this can include the sidecar 404 for the alert service 106 sending the updated data about clearing the alert A2 for the faulty flash drive to the sidecar 406 for the health service 108.

After the data originator service sends the updated data to the at least one of the other monitoring services, the at least one of the other monitoring services stores the updated data received from the data originator service, block 510. The system sends updated data to monitoring services which store the updated data to enable the synchronization of the updated data across the monitoring services. By way of example and without limitation, this can include the sidecar 406 for the health service 108 replacing the outdated data for the alert A2 with the updated data for alert A2 received from the sidecar 404 for the alert service 106.

Storing the updated data may include the at least one of the other monitoring services storing the updated data in a corresponding local cache. For example, the sidecar 406 for the health service 108 stores the updated data for alert A2 in the health service local cache. A corresponding local cache can be an auxiliary memory which is exclusively used in an area and from which high-speed retrieval is possible.

Following at least one of the other monitoring services storing the updated data from the data originator service, a determination is made whether each of the other monitoring services that received the synchronization indicator stored the updated data or is yet to initiate synchronization of the updated data, block 512. The system determines if the other monitoring services are ready to make the updated data simultaneously visible for users. In embodiments, this can include the sidecar 404 for the alerts service 106 setting a visibility flag for the updated data for the alert A2, because the monitoring services that received the synchronization indicator, which includes the health service 108 and the reports service 110, either stored the updated data for the alert A2 or did not yet initiate synchronization of the updated data.

If each of the other monitoring services that received the synchronization indicator stored the updated data or did not yet initiate synchronization of the updated data, then the flowchart 500 continues to block 514 to make the updated data simultaneously visible. If each of the other monitoring services that received the synchronization indicator either did not yet store the updated data or did not yet initiate synchronization of the updated data, the flowchart 500 remains at block 512 to wait until all of the other monitoring services are ready to simultaneously display the updated data.

If each of the other monitoring services that received the synchronization indicator stored the updated data or is yet to require the updated data from the data originator service, then the data originator services enable a simultaneous update for a display of the updated data for a user of any of the other monitoring services, block 514. The system simultaneously displays updated data by multiple monitoring services. For example, and without limitations, this can include the alert service 106, the health service 108, and the reports service 110 simultaneously updating the display of the updated data alert A2, which was enabled by the sidecar 406 for the health service 108 and the sidecar 408 for the reports service 110 identifying the visibility flag set for the updated data for the alert A2, and which is viewed as correct and consistent data by a user of the monitoring services 106-110.

A simultaneous update can be providing the latest information about somethings, which is occurring, operating, or done at the same time. A display can be a visual presentation on a screen. A user can be a person who operates a computer.

Enabling a simultaneous update may include a data originator service setting a visibility flag. For example, the sidecar 404 for the alerts service 106 set the visibility flag for the updated data for the alert A2. A visibility flag can be a variable used to indicate a property of the data in a record to be able to be seen.

Enabling a simultaneous update may include at least one of the other monitoring services flushing the updated data from a local cache, in response to a visibility flag being set by a data originator service. For example, the sidecar 406 for the health service 108 responds to the visibility flag being set for the updated data for the alert A2 by the sidecar 404 for the alerts service 106, by flushing the updated data for the alert A2 from the local cache for the health service 108.

Although FIG. 5 depicts the blocks 502-514 occurring in a specific order, the blocks 502-514 may occur in other orders. In other implementations, each of the blocks 502-514 may also be executed concurrently and/or in combination with other blocks and/or some blocks may be divided into a different set of blocks.

Exemplary Computing System

Figure 6:
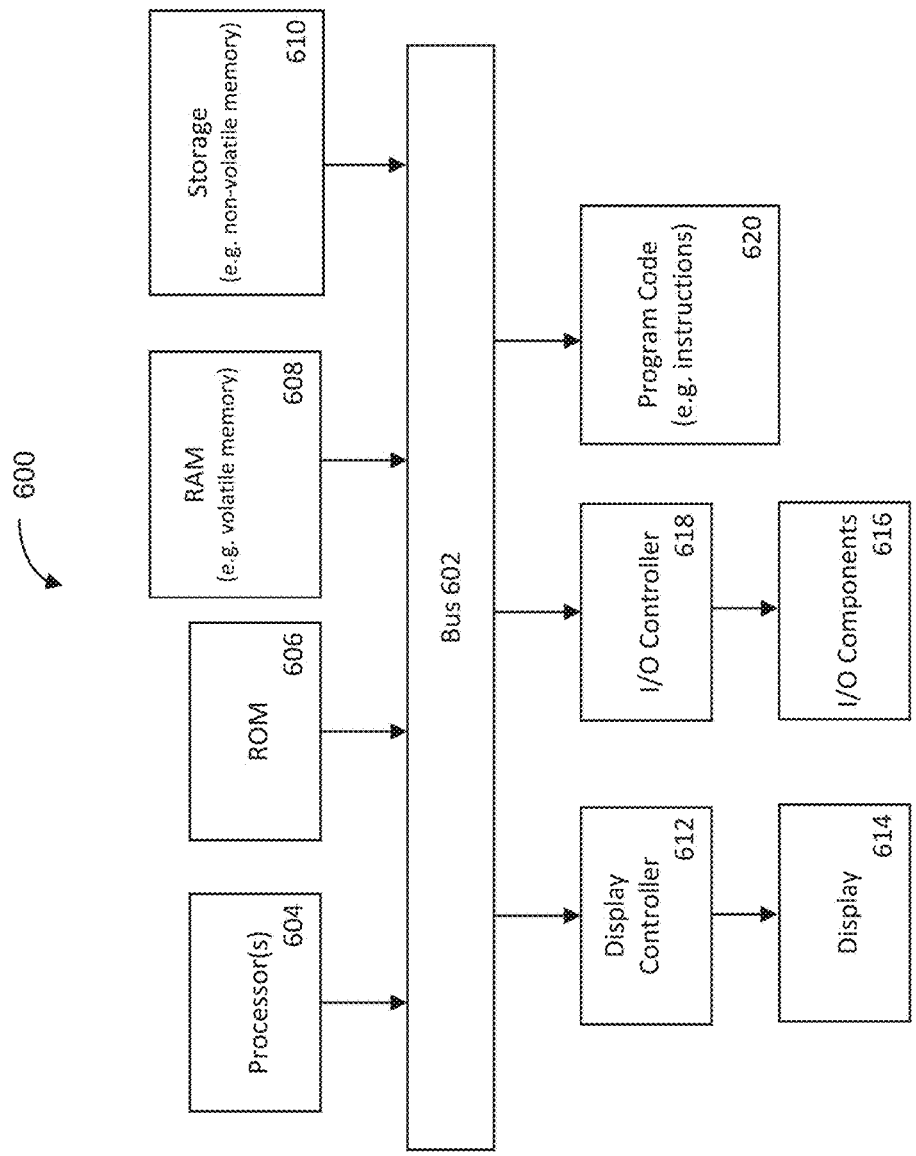
FIG. 6 is a block diagram illustrating a computing system for ensuring data consistency across multiple monitoring services for components of a data protection platform according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It can also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the system. It should be appreciated that storage 610 may be remote from the system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure are apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for ensuring data consistency across multiple monitoring services, comprising:
   one or more processors; and
   a non-transitory computer readable medium storing a plurality of instructions, which when executed, cause the one or more processors to:
   send, by a data originator service that monitors at least one component of a data protection platform, a synchronization indicator to monitoring services that monitor the at least one component of the data protection platform, in response to a determination that a synchronization criterion is satisfied;
   send, by the data originator service, updated data to at least one of the monitoring services, in response to a determination that the at least one of the monitoring services responds to receiving the synchronization indicator by initiating synchronization of the updated data;
   store, by the at least one of the monitoring services, the updated data received from the data originator service; and
   enable simultaneous update, by the data originator service, of a display of the updated data for a user of any of the monitoring services, in response to a determination that each of the monitoring services that received the synchronization indicator one of stored the updated data or is yet to initiate synchronization of the updated data.

2. The system of claim 1, wherein the synchronization criterion is satisfied by at least one of a specific number of data fields that changed, a specific value stored in a data field, or a maximum time that lapsed.

3. The system of claim 1, wherein the synchronization criterion is created by at least one of the monitoring services subscribing to at least one data field.

4. The system of claim 1, wherein the synchronization indicator comprises a synchronization token that lists details about the updated data, the details comprising at least one of an impacted area, or a value addition associated with at least one of a weight, a priority, or a category, wherein the details assist the monitoring services to determine whether to initiate synchronization of the updated data.

5. The system of claim 1, wherein storing the updated data comprises the at least one of the monitoring services storing the updated data in a corresponding local cache.

6. The system of claim 1, wherein enabling a simultaneous update comprises the data originator service setting a visibility flag.

7. The system of claim 1, wherein enabling a simultaneous update comprises the at least one of the monitoring services flushing the updated data from a corresponding local cache, in response to a visibility flag being set by the data originator service.

8. A computer program product comprising a non-transitory computer-readable medium having a computer-readable program code embodied therein to be executed by one or more processors, the program code including instructions to:
send, by a data originator service that monitors at least one component of a data protection platform, a synchronization indicator to monitoring services that monitor the at least one component of the data protection platform, in response to a determination that a synchronization criterion is satisfied;
send, by the data originator service, updated data to at least one of the monitoring services, in response to a determination that the at least one of the monitoring services responds to receiving the synchronization indicator by initiating synchronization of the updated data;
store, by the at least one of the monitoring services, the updated data received from the data originator service; and
enable simultaneous update, by the data originator service, of a display of the updated data for a user of any of the monitoring services, in response to a determination that each of the monitoring services that received the synchronization indicator one of stored the updated data or is yet to initiate synchronization of the updated data.

9. The computer program product of claim 8, wherein the synchronization criterion is satisfied by at least one of a specific number of data fields that changed, a specific value stored in a data field, or a maximum time that lapsed.

10. The computer program product of claim 8, wherein the synchronization criterion is created by at least one of the monitoring services subscribing to at least one data field.

11. The computer program product of claim 8, wherein the synchronization indicator comprises a synchronization token that lists details about the updated data, the details comprising at least one of an impacted area, or a value addition associated with at least one of a weight, a priority, or a category, wherein the details assist the monitoring services to determine whether to initiate synchronization of the updated data.

12. The computer program product of claim 8, wherein storing the updated data comprises the at least one of the monitoring services storing the updated data in a corresponding local cache.

13. The computer program product of claim 8, wherein enabling a simultaneous update comprises the data originator service setting a visibility flag.

14. The computer program product of claim 8, wherein enabling a simultaneous update comprises the at least one of the monitoring services flushing the updated data from a corresponding local cache, in response to a visibility flag being set by the data originator service.

15. A computer-implemented method for ensuring data consistency across multiple monitoring services, comprising:
sending, by a data originator service that monitors at least one component of a data protection platform, a synchronization indicator to monitoring services that monitor the at least one component of the data protection platform, in response to a determination that a synchronization criterion is satisfied;
sending, by the data originator service, updated data to at least one of the monitoring services, in response to a determination that the at least one of the monitoring services responds to receiving the synchronization indicator by initiating synchronization of the updated data;
storing, by the at least one of the monitoring services, the updated data received from the data originator service; and
enabling simultaneous update, by the data originator service, of a display of the updated data for a user of any of the monitoring services, in response to a determination that each of the monitoring services that received the synchronization indicator one of stored the updated data or is yet to initiate synchronization of the updated data.

16. The computer-implemented method of claim 15, wherein the synchronization criterion is satisfied by at least one of a specific number of data fields that changed, a specific value stored in a data field, or a maximum time that lapsed, and the synchronization criterion is created by at least one of the monitoring services subscribing to at least one data field.

17. The computer-implemented method of claim 15, wherein the synchronization indicator comprises a synchronization token that lists details about the updated data, the details comprising at least one of an impacted area, or a value addition associated with at least one of a weight, a priority, or a category, wherein the details assist the monitoring services to determine whether to initiate synchronization of the updated data.

18. The computer-implemented method of claim 15, wherein storing the updated data comprises the at least one of the monitoring services storing the updated data in a corresponding local cache.

19. The computer-implemented method of claim 15, wherein enabling a simultaneous update comprises the data originator service setting a visibility flag.

20. The computer-implemented method of claim 15, wherein enabling a simultaneous update comprises the at least one of the monitoring services flushing the updated data from a corresponding local cache, in response to a visibility flag being set by the data originator service.

* * * * *